A. T. SAUNDERS.
BOOT OR SHOE SOLE.
APPLICATION FILED AUG. 7, 1917.
1,390,462. Patented Sept. 13, 1921.
Fig. 1.
Fig. 3.
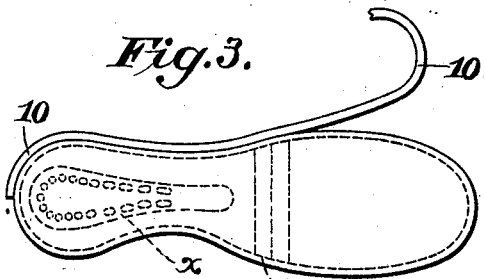
Fig. 2.
Fig. 8.
Fig. 4.
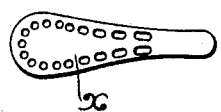
Fig. 7.
Fig. 6.
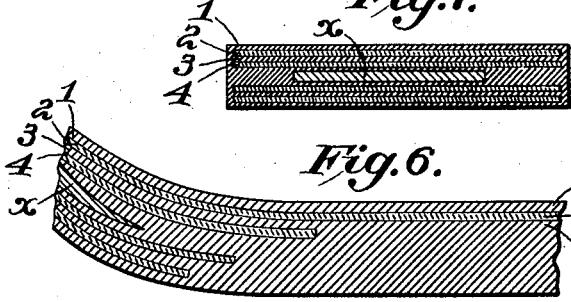
Fig. 5.
Fig. 6ª.
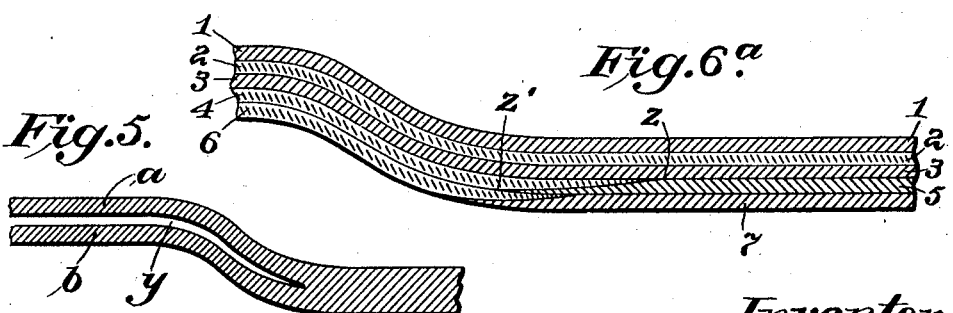
Inventor:
Addison T. Saunders,
by Spear Middleton, Donaldson & Spear
Att'ys.

UNITED STATES PATENT OFFICE.

ADDISON T. SAUNDERS, OF CHICOPEE, MASSACHUSETTS, ASSIGNOR TO A. G. SPALDING & BROS., OF JERSEY CITY, NEW JERSEY, A CORPORATION OF NEW JERSEY.

BOOT OR SHOE SOLE.

1,390,462.   Specification of Letters Patent.   Patented Sept. 13, 1921.

Application filed August 7, 1917. Serial No. 184,951.

*To all whom it may concern:*

Be it known that I, ADDISON T. SAUNDERS, a citizen of the United States, and resident of Chicopee, Massachusetts, have invented certain new and useful Improvements in Boot or Shoe Soles, of which the following is a specification.

My invention relates to boot or shoe soles and more particularly to that class of soles made of rubber or rubber compound, usually fiberized or compounded with mineral fillers, such soles being capable of attachment to an upper of different material, such as leather, canvas or the like.

Heretofore soles other than leather, of such materials as just mentioned, generally have been flat in form, similar to that of a piece of leather as cut for applying. Sometimes these soles are made thicker on the tread portion than in the shank, and some are made with the heel molded on.

So far as I am aware, however, all of these soles are as flexible in the shank as elsewhere, and usually more so because the shank is made thinner or narrower than the tread. They have no arch and they afford no support to the arch of the foot, thus leading to discomfort and injury to the wearer.

It has not been found practicable to make a sole in one piece comprising a rubber tread and an arch of leather with the unitary character desirable, because leather will not stand the heat required to vulcanize the rubber portion.

My invention provides a method of and means for making soles comprising rubber compounds and having arched and stiffened shanks integral with the softer tread portion enabling them to be used for classes of foot wear for which the usual types are not suited.

In other words the invention combines in the article the advantages of the usual leather sole having an arched shank with those of the rubber compound soles of present manufacture and the invention lies in the article produced and in the method and means for making the same.

This improved sole comprises a tread portion of vulcanized rubber compound and an arched shank of stiffer character continuous and integral with the tread portion and adapted to be used in manufacture in combination with the usual upper of foot-wear, to be attached to the upper by stitching or other methods. The sole may be made with an integral heel of vulcanizable material or this heel portion may be made to embody other materials which will endure such heat or an ordinary heel may be attached.

The invention consists in the features and combination and arrangement of parts hereinafter described and particularly pointed out in the claims.

In the drawings;

Figure 1 shows a sole made according to my invention with an arch-shaped shank continuous and integral with the tread, and an integral heel is also shown. The sole is shown as attached to the upper which is broken away.

Fig. 2 represents the sole in section as made without the heel, such sole being adapted for attachment to a suitable upper.

Fig. 3 is a plan view of the sole indicating in dotted lines an inserted stiffening member or shank piece and indicating also in dotted lines the outline of fabric layers or pieces in the shank and showing also an edge strip partly attached to the composite sole.

Fig. 4 is a plan view of a shank piece adapted for insertion in the shank of the sole, said piece being perforated to receive material for holding it in place.

Fig. 5 is an elevation of a portion of the sole at the shank showing an optional construction, the shank being so molded as to leave an opening to permit the insertion of a shank piece after vulcanization, thus permitting the use of stiffening material not adapted to withstand vulcanization heat.

Fig. 6 is an enlarged view of that portion of the sole, including the rear part of the tread and forward part of the shank to illustrate the location of layers of fabric laminated, or not, with rubber compound layers.

Fig. 6ª is a sectional view illustrating the junction of the shank layers with tread layers in one form of the article.

Fig. 7 is a cross section of the sole through the shank on the line 7—7 of Fig. 2.

Fig. 8 shows a formed plate upon which the laying up of the sole laminations may be conveniently effected.

I carry my invention into effect preferably as follows: Having provided a suitable mold featured with a shape to produce the desired arching of the shank, and preferably of the usual two-piece type I mix and calender in thin sheets a quantity of rubber compound or if this compound is of a character such as will mold well in the mass I may sheet a portion of the same of sufficient thickness to fill the tread portion of the mold in a single layer.

When using "pure gum" compound or one likely to hold air blisters in sheeting, I prefer to run the material thin to be laid up in laminations, even in the portions where these are not interlaid with fabric as referred to hereinafter.

Having produced the material in sheet form I next die out from these sheets pieces approximating the size of the mold or portions thereof as will appear hereinafter.

A suitable fabric is frictioned or coated on both sides with a rubber compound adapted to be vulcanized or cured together with the above sheets of rubber compound and from this frictioned fabric I die out pieces to be used in making up the shank portion of the sole, and some of these pieces of frictioned or rubberized fabric are of a length not to extend throughout the length of the tread, while as to the rubber pieces or sheets of rubber compound some of these may be used for the tread only to enable the more convenient laying up of the sole.

Assuming that the attaching surface i. e. that side of the sole which is to be next to the upper of the shoe, to be the side first built, as generally will be most convenient, I preferably lay down a piece of the rubber compound died out from the calendered sheet, this being indicated at 1, Figs. 6, 6ª and 7, this sheet extending throughout the length of the sole and upon this I lay a like piece of the rubber coated fabric 2 and unite them by rolling in the usual way of making such laminations.

This layer 2 may extend throughout the length of the sole and therefore lying both in the shank portion and in the tread portion. I next add another rubber layer 3 and repeat the rolling. Next I lay a piece 4 of coated fabric, this being of a length to reach say only to the point $z$, Figs. 2 and 6, and I then place a layer 5 of the rubber compound reaching from the toe at the right of the figure past the point $z$ to the point $z'$ and thus overlapping the inner end of the rubber coated fabric layer 4 between the points $z$ and $z'$, it being clear that the layer 4 extends throughout the shank portion and into the tread portion partway. Then follows a layer 6 of the rubber coated fabric which is shorter than the layer 4 and next the layer 7 is laid on, which is of the rubber compound or tread compound, this layer being longer than the layer 5 from all of which it will be clear that by successively applied layers overlapping each other at their meeting ends the entire sole is built up to the proper thickness for curing and the shank portion will comprise material which will stiffen it and provide a firm arched support.

While in the drawings, Fig. 6ª, the overlapping ends of the coated fabric layers of the shank portion and the rubber compound layers of the tread portion are shown as tapered it will be understood that this illustrates the effect of the flowing together and blending of the compounds in rolling and curing and not that the edges or ends of the layers being united are necessarily of the tapered form shown.

While the drawing illustrates the preferred positioning of the meeting ends of the layers of tread compound and the layers of coated fabric for the shank portion it will be understood that this positioning may be changed by making the layers of equal length or by making some of the lower layers of coated fabric longer than those above.

I would point out here that I may make the tread of a different compound from that of the shank or arch, or the face or other portion of the tread may be varied as to its compound or it may be fiberized. For instance I may make the arch or shank portion of a compound which cures much harder than the tread compound and the face of the tread may be of the compound in which fiber is mixed or the tread may be more highly fiberized at its face than throughout its body, or the reverse arrangement may be employed but in all cases it is desirable that the various compounds cure harmoniously.

I may perform the laying up of the sole upon a flat surface, but I prefer to do so upon a formed surface or plate, such as shown in side elevation, Fig. 8, the upper surface of this plate having approximately the same curve as the finished sole and this enables the building up of the laminations to be performed in substantially their final relative positions, and obviates the slipping of one layer upon another, which might otherwise occur in molding.

It will be understood that the sole is laid up in such position on this form as to bring the curves into the proper position in the sole and running in the right direction. It will also be understood that the laminations may be laid up from the undied out sheets and the cutting out to the proper shape may be afterward performed.

I prefer to carry this lamination of rubber coated fabric practically throughout the full thickness of the shank portion of the sole, except for a space occupied by a stiffening member $x$, when such member is used, this being optional.

In some cases the tread portion of the sole may be better without the single layer of the fabric 2 shown in Fig. 7.

As intimated above that portion of the sole forward of the fabric layers i. e. the tread proper, may be laid in a single piece of sufficient thickness to provide the entire thickness of sole at this point.

When using the fabric coated with a compound which blends freely with the compound comprised in the tread portion of the sole I may, instead of interlapping the laminations of coated fabric and tread compound, form a butt joint between the tread portion and the ends of the rubberized or rubber coated fabric sections which will unite integrally at this butt joint when vulcanized. However the "feathering" of the fabric layers into the tread portion, as shown in Fig. 6 affords a strong union between arch or shank and tread while the latter is left unstiffened. When rubber compounds are used for the shank capable of curing sufficiently hard to provide the requisite stiffness of the arch the layers of fabric need not extend throughout the shank and heel portion but only far enough to afford a strong connection of the shank and tread portions, the fabric of course adding some stiffness to the sole at the point where it is laid in. The portion of the shank from which the fabric layers are omitted, if desired, may be fiberized, while the tread is left unfiberized.

I may graduate the curing time of the compounds for the different portions of the sole, using for the shank portion a compound demanding a hotter or a longer cure than for the tread portion and by manipulation or the employment of molds adapted to be raised to a higher temperature in one portion than in the other or by the use of cooling means, which will cool one portion of the mold more rapidly than another portion, I may secure the desired difference in the hardness or stiffness of the various portions of the sole. I may carry these graduations of cure and hardness to a greater refinement by using a rubber compound of intermediate character in that portion where the shank merges into the tread, so that in vulcanizing, the shank portion will be cured to the hardest or stiffest degree, the tread portion will be cured to the lowest degree of hardness and at the point where the shank merges into the tread an intermediate degree of hardness or stiffness will be secured. I may accomplish these graduations at the merging point of the shank and tread by graduating the amount of sulfur or of a cure accelerator in the compound. To illustrate: In laying up the sole blank in laminations I may mechanically dust upon the surface of the parts of the layers to be stiffened an accelerator material either in its full strength or intermixed with an inert comminuted material and so graduating the deposit that the character of the vulcanizable material is graduated from those portions which are to be hard and stiff to those portions which are to be most yielding.

Referring to the metal shank piece shown at $x$ embedded in the shank comprising the rubber it will be understood by reference to Fig. 5 that in laying up this portion of the sole a piece of sheet metal is used in the space $y$, which is subsequently to receive the reinforcing metal shank $x$ and this metal piece will hold the two portions of the shank at $a$ and $b$ apart, and after curing this metal piece is removed. When the shank piece $x$ is inserted it may be cemented in place, the cement filling the openings in the shank piece and thus connecting the upper and lower portions $a$, $b$, thereof or if the shank piece $x$ is inserted before vulcanization is effected the openings in the shank piece will receive the rubber compound and the layers $a$ and $b$ will be united through these openings.

If the shank piece $x$ be of metal it may be treated and cemented as is usual in uniting rubber and metal as well known in the art. The shank stiffening piece $x$ may be of material other than metal or it may be used without the perforations. When perforated I prefer to make small perforations near the edges and not extending into the forward end of the piece.

Any number of layers of fabric within the space or thickness of the sole may be used in the shank portion and so thinly coated or interlaid with rubber that the stiffening effect of the fabric is gained to the maximum or as indicated above hard or "half-hard" compounds of known or special formulæ may be used in this portion of the sole, either with or without the fabric or the intermixed fiber.

When the laying up of the sole is completed as to thickness I trim it to insure evenness at the edges and to a size sufficiently less than the mold to allow for a fillet of rubber 10, Fig. 3, which may be of the same compound throughout when the character of the compound at different parts of the sole is alike or this fillet may be varied in character for different parts.

I lay this fillet on as indicated so as to border the sole and cover the edges where the fabric might be exposed and the fillet is of a width to secure the concealment of the fabric in any usual trimming of the sole in making up with the upper. Instead of using this fillet the fabric may be cut or died smaller than the mold and the flowing of the stock in molding may be depended upon to cover the edges of the fabric, and this is indicated in Fig. 3, by the dotted outline at $v$ representing the edge end fabric.

I may finish the shank portion of the sole with a hard varnish, polish, or enamel.

As an optional means of hardening the shank or as an additional means for hardening or stiffening the shank I may first semicure the material designed for the shank before laying up the sole, so that when the entire sole, with the shank and tread portions, is laid up and cured together the shank portion will be stiffer because of the two cures to which it has been subjected.

It will be understood that while I have described various ways of securing the stiffening of the shank portion of the sole relative to the tread portion I may employ the various ways of accomplishing this effect in one and the same sole; that is to say, the fabric together with the stiffening piece $x$ may be incorporated in the same shank having a compound of such different character from the compound comprised in the tread portion that a relative stiffness of the shank portion will result from the curing of the entire sole or the feature of the double cure or the extra cure may be employed in connection with the same sole having the fabric and the stiffener incorporated therein.

Features of the invention which are not specifically claimed herein will be made the subject of another application or applications.

It is obvious that the inserted metallic shank, when this is used, being of less width than the compound material forming the shank of the sole, will be held by the margins of this material when united along said margins.

Where in the appended claims reference is made to the fabric localized in the shank it will be understood that this is used in a generic sense and thus includes within its scope the broad feature as well as the specific embodiment of the invention shown notwithstanding the fact that some of the fabric lies in the tread portion.

What I claim is:

1. A sole for a boot or shoe having a tread and an arch shaped shank, both vulcanized, the shank having fibrous material localized therein, and thereby rendered stiffer than the tread, substantially as described.

2. A sole for a boot or shoe having a tread and an arch shaped shank, both vulcanized, the rubber of the arched shank being stiffer than the tread, and having fibrous material localized therein which also stiffens the arch shaped shank in respect to the tread.

3. A molded vulcanized sole having a tread portion and an arch shaped shank, the latter having an insertion of material treated so as to be capable of vulcanization to a relatively greater degree of hardness than the body of the sole, as the sole is vulcanized.

4. A molded vulcanized sole, having an insertion of fibrous material treated so as to be capable of vulcanization to a relatively greater degree of hardness than the body of the sole as the sole is vulcanized.

5. A molded vulcanized sole, having a reinforcing insertion of material impregnated with substance capable of being vulcanized to a relatively harder degree than the body of the sole as the sole is vulcanized.

6. A vulcanized molded sole, having a reinforcing insertion capable of being vulcanized to a relatively greater degree of hardness than the body of the sole as the sole is vulcanized, and including a shank piece portion and a portion projecting substantially around the forward and ball portion of the sole.

7. A vulcanized molded sole, having a reinforcing insertion capable of being vulcanized to a relatively greater degree of hardness than the body of the sole as the sole is vulcanized, and including a shank piece portion of relatively greater thickness and a relatively thinner portion projecting substantially around the forward and ball portion of the sole.

8. A sole for a boot or shoe having a tread comprising vulcanized rubber and a shank portion integral therewith comprising vulcanized rubber and fabric localized thereto, the said localized fabric rendering the shank stiffer in respect to the tread, substantially as described.

9. A sole for a boot or shoe having a tread comprising vulcanized rubber and a shank integral therewith and comprising vulcanized rubber and fabric, said fabric being mainly localized to the shank but extending to the tread portion and strengthening the integral union of said tread and shank and rendering the shank stiffer in respect to the tread, substantially as described.

10. A sole having a tread comprising a vulcanized rubber compound and a shank comprising vulcanized rubber and fabric, said shank and tread portion being integral and the shank rubber being stiff relative to the rubber of the tread, said fabric extending from the stiff shank to the tread and strengthening the union of said shank and tread, substantially as described.

11. A sole having a tread portion comprising a vulcanized rubber compound and a shank of vulcanized rubber integral with the tread and with layers of fabric of different lengths reaching into the tread portion from the shank portion and to different points along the tread, substantially as described.

12. A sole for a boot or shoe having a tread and a shank, both vulcanized, the shank having fibrous material localized therein, and thereby rendered stiffer than the tread, substantially as described.

13. A sole for a boot or shoe having a tread and a shank, both vulcanized, the rubber of the shank being stiffer than the tread, and having fibrous material localized therein, which also stiffens it in respect to the tread, substantially as described.

ADDISON T. SAUNDERS.